United States Patent [19]

Devine

[11] Patent Number: 5,087,158
[45] Date of Patent: Feb. 11, 1992

[54] DRILLING JIG FOR HOLDING DRILLING DEBRIS

[75] Inventor: Martin J. Devine, Brockton, Mass.

[73] Assignee: GTE Government Systems Corporation, Waltham, Mass.

[21] Appl. No.: 610,476

[22] Filed: Nov. 7, 1990

[51] Int. Cl.$^5$ .............................................. B23B 47/34
[52] U.S. Cl. ..................... 408/67; 408/72 B; 408/241 B
[58] Field of Search ............ 408/67, 72 R, 72 B, 408/76, 115 R, 115 B, 241 B

[56] References Cited

U.S. PATENT DOCUMENTS 2,548,314  4/1951  Kinney, Jr. ........................ 408/67
2,788,684  4/1957  Scharf ................................ 408/72

FOREIGN PATENT DOCUMENTS 1960440  6/1971  Fed. Rep. of Germany ........ 408/76
2054128  5/1972  Fed. Rep. of Germany ... 408/241 B
2212080  7/1989  United Kingdom ................. 408/67

Primary Examiner—Daniel W. Howell

[57] ABSTRACT

A drilling jig for holding cutting chips and other debris has two separable sections. A cylindrical body has one closed end and one open end. A circular cap is adapted to fit in or over the open end of the cylindrical body. Aligned axial holes are provided through the closed end of the cylindrical body and through the cap. An adhesive layer temporarily adheres the jig to a workpiece.

1 Claim, 1 Drawing Sheet

DRILLING JIG FOR HOLDING DRILLING DEBRIS

BACKGROUND OF THE INVENTION

This invention pertains to drilling jigs and more particularly is concerned with drilling jigs adapted for holding cutting chips and other drilling debris.

Drilling jigs are commonly used in shops and in the field to align a bit during drilling operations. In their simplest form, a pre-drilled sheet is secured in position on the workpiece and used to guide the cutting bit. In any drilling operation, chips or other debris from the cut material are generated. It is known in the art to use a simple cup about the bit to contain such chips and debris. Such cups are held by hand to the drilling surface and do not serve to align the bit, but indeed make visual positioning more difficult.

SUMMARY OF THE INVENTION

Briefly, there is provided a drilling jig for holding cutting chips and other debris. The jig has two separable sections. A cylindrical body has one closed end and one open end. A circular cap is adapted to fit over or in the open end of the cylindrical body. Aligned axial holes are provided though the closed end of the cylindrical body and though the cap. An adhesive layer temporarily adheres the jig to a workpiece.

DETAILED DESCRIPTION OF THE INVENTION

Figure 1:
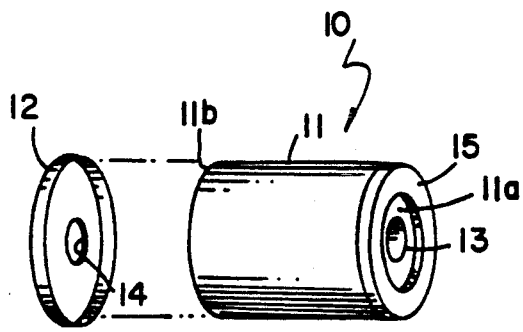
FIG. 1 illustrates the dissembled drilling jig of the invention.
Figure 2:
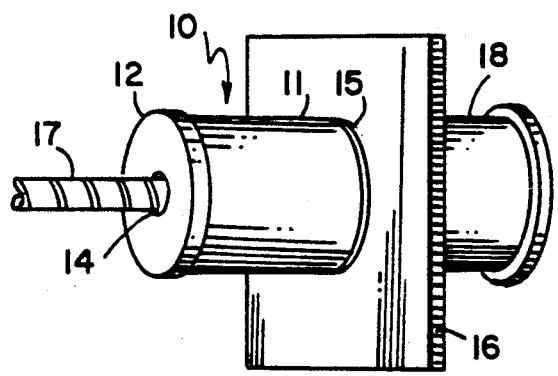
FIG. 2 illustrates the drilling jig on a workpiece.

Referring to the drawings, there is seen a drilling jig 10 embodying the invention. Jig has two separable sections: a cylindrical body 11 with one closed end 11a and one open end 11b; and a circular cap 12 adapted to fit over the open end 11b of cylindrical body 11. Aligned axial holes 13, 14 are provided in the closed end 11a of the cylindrical body 11 and the cap 12 respectively. The external side of cap 12 is provided with an adhesive layer 15 so that it will temporarily adhere to a workpiece 16.

In practice, hole 14 in cap 12 is aligned with the desired drill location on workpiece 16 and cap 12 is pressed on the surface of the workpiece 16. The open end 11b of cylindrical body 11 is then fitted in or over the cap 12. A drill bit 17 is passed through the two holes 13, 14 which serve to guide bit 17 to the desire location on the workpiece 16. Chips and other debris from the drilling operation are contained in cylindrical body 11.

Preferably both cylindrical body 11 and the cap 12 are made of flexible plastic so that the segments may snap together and apart.

The preferred embodiment of the invention and the best mode of practicing the invention have been disclosed. Alternatives and modifications will be apparent to those skilled in the art in view of these teachings. Therefore scope of the invention is to be determined from the claim.

What is claimed is:

1. A drilling jig for holding cutting chips and other debris comprising two separable sections: a cylindrical body with one closed end and one open end; and a circular cap adapted to fit in or over the open end of the cylindrical body, said closed end of the cylindrical body and said cap defining aligned axial holes, said jig provided with an adhesive layer for temporarily adhering the jig to a workpiece.

* * * * *